Nov. 9, 1943.   C. E. KRAUS   2,333,653
ROTARY CUTTER
Filed Jan. 16, 1942   3 Sheets-Sheet 1
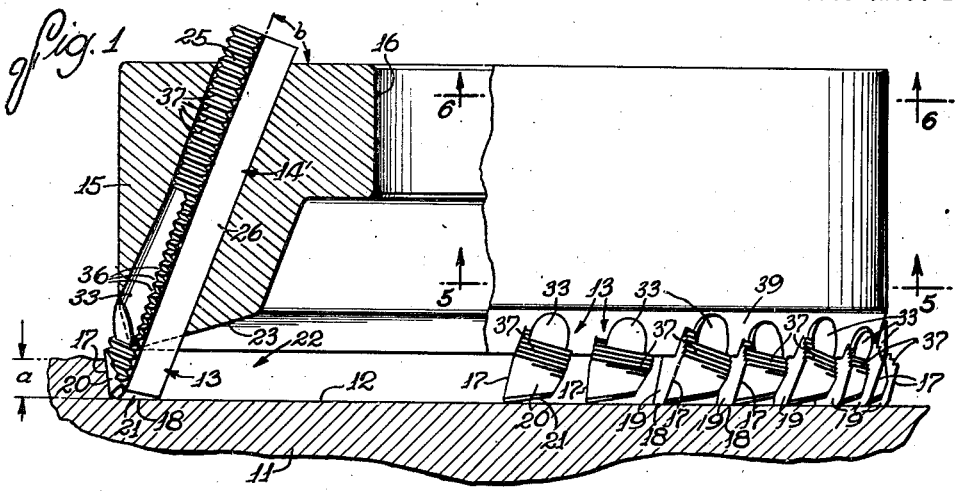
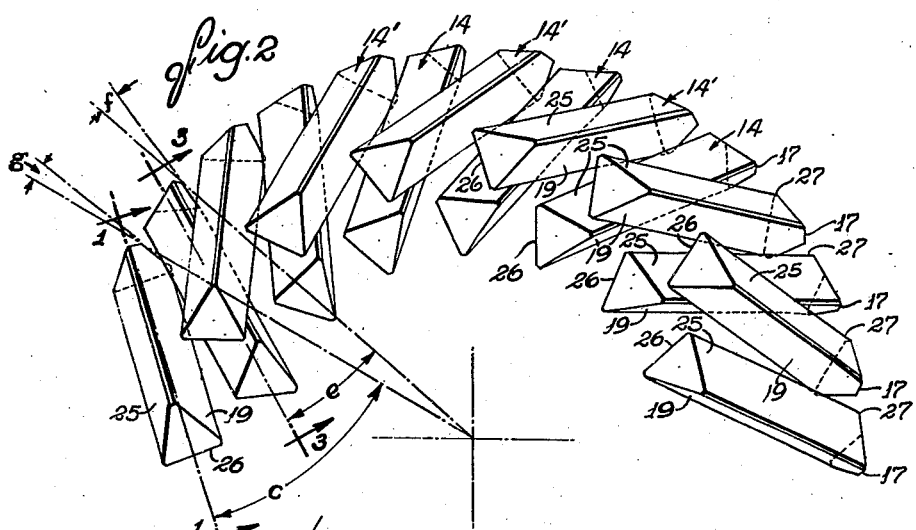
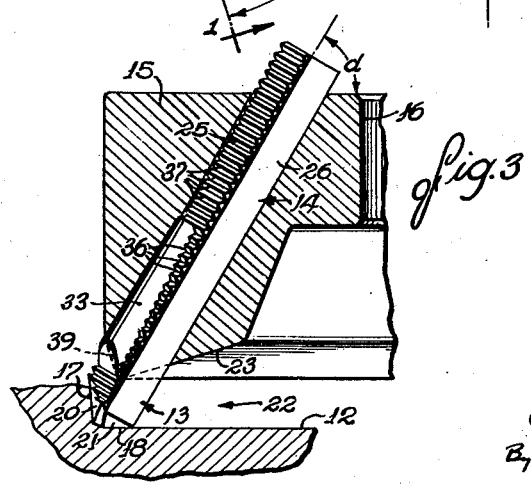
INVENTOR
Charles E. Kraus
By Parker, Carlson, Pitzner & Hubbard
ATTORNEYS Nov. 9, 1943.  C. E. KRAUS  2,333,653
ROTARY CUTTER
Filed Jan. 16, 1942  3 Sheets-Sheet 2

INVENTOR
Charles E. Kraus
By Parker, Carlson, Pitzner & Hubbard
ATTORNEYS

Nov. 9, 1943.  C. E. KRAUS  2,333,653
ROTARY CUTTER
Filed Jan. 16, 1942  3 Sheets-Sheet 3
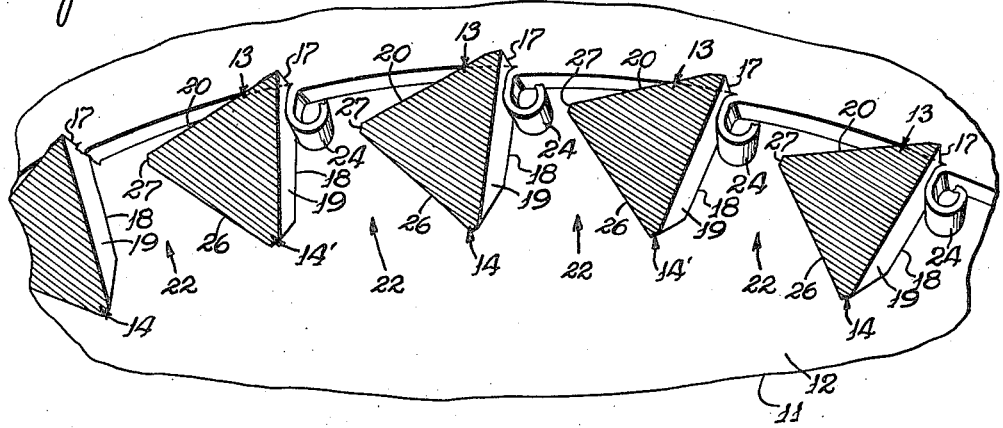
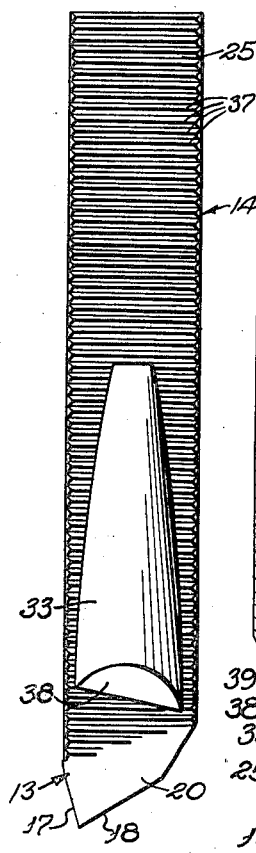
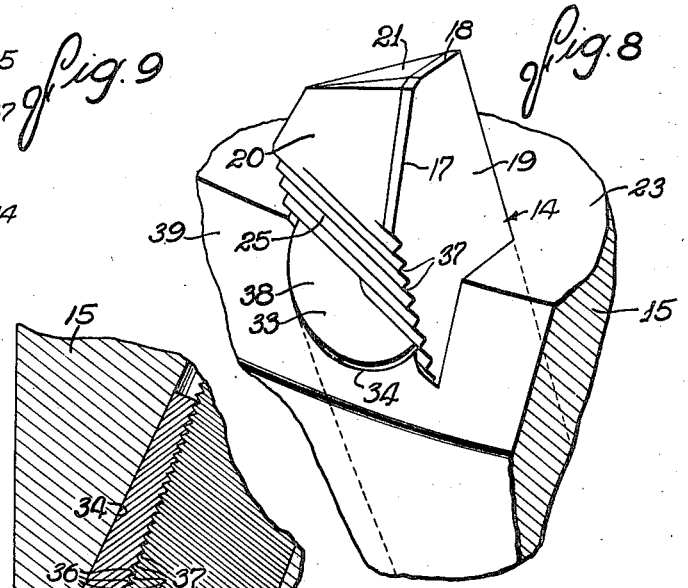
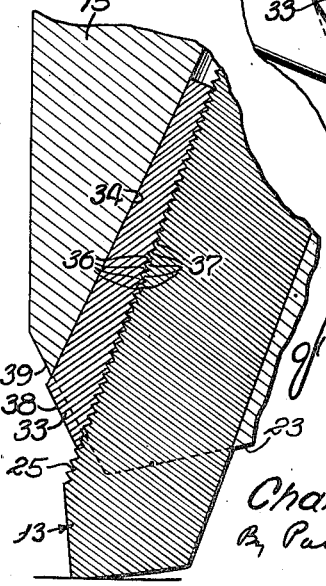
INVENTOR
Charles E. Kraus
By Parker, Carlson, Pitzner & Hubbard
ATTORNEYS Patented Nov. 9, 1943

2,333,653

UNITED STATES PATENT OFFICE 2,333,653

ROTARY CUTTER

Charles E. Kraus, Rochester, N. Y.

Application January 16, 1942, Serial No. 427,038

13 Claims. (Cl. 29—105)

This invention relates to multiple toothed cutters of the type employed for performing a so-called face milling operation.

The general object is to produce a substantial increase in the rate at which smooth surfaces may be formed by such cutters without at the same time increasing their cost of construction or maintenance in service.

In conventional face milling cutters, no attempt is made to control the flow of chips. Some are thrown under the cutter between the work surface and the cutter while others are carried around between adjacent teeth. This reduces the service life of the cutter and necessitates wide spacing of the teeth in order to avoid clogging with a consequent reduction in permissible rate of feed.

A more detailed object therefore is to provide a face milling cutter in which control of the chip flow is so complete and positive that the spacing of the cutter teeth may be reduced materially and the permissible rate of feed thus increased correspondingly.

Another object is to provide a cutter in which the cutter body and the side walls of the adjacent teeth coact in a novel way to provide effective guiding and disposal of the chips.

The invention also resides in the novel arrangement of the blades in the cutter body to insure proper rigidity of the blade mounting in spite of the close spacing of the blades.

Still another object is to provide a novel mounting for the cutter blades which coacts with the blade shape and arrangement to provide for effective locking, most efficient use of the cutting material, optimum range of adjustability, and ease of sharpening.

A further object is to control the vibration producing tendency incident to the cutting action.

Other objects and advantages of the invention will become apparent from the following detailed description taken in connection with the accompanying drawings, in which Figure 1 is an elevational view of a cutter embodying the present invention, a portion being shown in section along the line 1—1 of Fig. 2.

Fig. 2 is a fragmentary perspective view showing the arrangement of the cutter blades, the serrations thereon being omitted.

Fig. 3 is a fragmentary diametrical sectional view of the cutter showing a different blade than the one shown in the sectioned part of Fig. 1, the section being along the line 3—3 of Fig. 2.

Fig. 4 is a fragmentary end view.

Figs. 5 and 6 are fragmentary sectional views taken respectively along the lines 5—5 and 6—6 of Fig. 4.

Fig. 7 is a perspective plan view illustrating the action of the cutter teeth on a work piece.

Fig. 8 is a fragmentary perspective view illustrating the blade locks.

Fig. 9 is an elevational view of a blade and its locking wedge.

Fig. 10 is a section taken along the line 10—10 of Fig. 5.

For purposes of illustration, the invention is embodied in a so-called inserted blade cutter for removing a layer $a$ of metal from a work piece 11 to form a smooth surface 12 during relative feeding of the work and cutter along the surface while the cutter is rotating clockwise. It is to be understood that I do not intend to limit the invention by such exemplary disclosure but aim to cover all modifications, alternative constructions, and uses falling within the spirit and scope of the invention as expressed in the appended claims.

The cutter comprises an annular series of teeth 13 constituting the ends of blades or bars 14 and 14' of cutting material and projecting from one end of a body 15 which in this instance is a single ring-like forging. The latter may be fastened in any suitable way to the end of a power driven spindle (not shown) projected through a central recess 16 in the body.

Each tooth 13 has a main or side cutting edge 17 and an end or finishing edge 18 both disposed in the plane of the leading or cutting face 19 of the tooth. Surfaces 20 and 21 are ground on the end of the tooth to provide proper relief for the cutting edges. In accordance with the present invention, the cutting faces 19 of each tooth and a rear surface on the preceding tooth coact to provide a passage 22 diverging inwardly and radially between the work surface 12 and the end face 23 of the body 15. This passage is so positioned and shaped as to receive the chips 24 formed by the cutting edges 17 and guide the same positively in a well defined path toward the center of the cutter until they pass the work.

To form such a passage without sacrificing tooth strength, the teeth 13 are made generally triangular in cross-section having side surfaces 25 and 26 intersecting each other and each intersecting the other side which defines the cutting face 19. Herein, a substantially equilateral shape is employed with the side 25 facing outward radially with its trailing edge 27 disposed at a shorter radius than the cutting edge 17 so as to provide proper clearance for the latter. The sides 19 and 26 of each tooth thus converge inwardly and each coacts with the other side of the next adjacent tooth to define one of the chip passages 22 which opens inwardly and diverges quite sharply. The throat of this passage between the edge 27 of one tooth and the face 19 of the next tooth is so sized and located as to insure entry of the chips that naturally flow inwardly from the main cutting edge 17 and then prevent escape of the chips outwardly while permitting and inducing free inward flow even though the chips may take the form of spiral coils. Thus, the edge 27 is spaced radially only a short distance inwardly from the cutting edge 17 of the next tooth. Also, it is spaced close to the cutting face 19 and thus traps the entering chips and prevents reversal of their flow. With the triangular construction, the side 26 of one tooth is disposed at such a large angle relative to the face 19 of the following tooth as to allow ample space of increasing width for coiling of the chips or accumulation of chip pieces without any possible danger of clogging.

To further insure effective disposal of chips, the end face of the cutter body is contoured to provide for divergence of the chip passages axially of the cutter, that is, in a direction transverse to the radial divergence. This is accomplished by coning the outer peripheral portion 23 of the end face so that this surface diverges inwardly from the finished work surface 12 as shown in Figs. 1 and 3. Thus, the chip passages diverge in two transverse directions and provide adequate space for disposal of the chips in spite of the close spacing of the teeth which is employed in order to trap the chips and guide them positively in the proper direction. Accordingly, it is impossible to pack or clog the chip cavities.

The close spacing of the teeth which is made possible by the effective chip disposing action above described enables the number of teeth in a cutter of given diameter to be increased considerably as compared to conventional face milling cutters. For example, in ordinary cutters of the medium duty type, the blade pitch is about one and one-eighth inches. With the tooth arrangement above described, a pitch of five-eighths of an inch may be used in the same type of cutter with an increase of seventy-five per cent in permissible feed rate and without any sacrifice in cutting efficiency or smoothness of finish. Similarly, in a cutter of the extra heavy duty type, the blade pitch may be one and five-eighths inches as compared to two and five-eighths inches which is the pitch commonly provided in such cutters.

The triangular blades above described are, of course, mounted in openings 30 of corresponding cross-sectional shape annularly spaced around the ring 15 and extending generally longitudinally of the cutter axis so that the end from which the blade projects terminates substantially at the junction of the peripheral and end surfaces of the ring while the opposite end is spaced inwardly from the body periphery. The sides 19 and 26 of the blades fit against the walls 31 and 32 of the openings, which walls thus provide solid backings for sustaining the forces applied to the blades as an incident to the cutting action.

While the blades may be locked in place in various ways, means is preferably employed which permits all sides of the openings 30 and the sides 19 and 26 of the blades to be smooth, which coacts with the outwardly facing sides 25 of the blades, which permits of ready adjustment of the blades for wear, and which does not necessitate special sharpening methods. Herein, the locking means includes a wedge 33 rounded on one side to seat in a complemental groove 34 in the outer wall 35 and having transverse serrations 36 formed on its opposite side to interfit with complemental serrations 37 on the side 25 of the blade. The wedge and groove taper away from the toothed end of the cutter and the wedge thickness is such that in the locked position of the blade, the large end 38 of the wedge is disposed substantially flush with the beveled surface 39 of the cutter body.

The wedge lock thus constructed and mounted in relation to the sides of the triangular blade has numerous advantages. It permits the use of blades of maximum length and the formation of the blade recesses in the body by a simple broaching operation. The location on the outer side of the blade does not in any way interfere with the spacing of the blades, and the wedge functions to force the other two sides against the solid body walls 31 and 32. For the same reason, the blade serrations are outside of the chip passages and do not interfere with the flow of chips across the cutting face or through the passages 22.

To permit the blades to be located close together as described above without interference of the blades or sacrificing rigidity of their mounting, the blades are distributed around the metal of the body 15 in staggered relation with the adjacent blades disposed at different angles to the plane of rotation but with their active ends projecting from the body at substantially the same radius so that the cutting edges may be equidistant from the axis. In this instance, half of the blades indicated by prime numbers are canted radially at an angle $b$, about seventy degrees in the present instance, to the plane of cutter rotation and then tilted circumferentially and reversely to the direction of cutter rotation through an angle $c$ which is about forty-five degrees as indicated in Fig. 2. The remaining blades 14 are similarly canted and tilted but at angles $d$ and $e$ which are approximately sixty and twenty-five degrees respectively as indicated in Figs. 2 and 3. For a purpose to appear later, the blades 14' and 14 are also twisted relative to the cutter body about their longitudinal axes to set the cutting faces 19 at different rake angles $f$ and $g$ twelve and eight degrees, as shown in Fig. 2. The result of this blade arrangement is that beginning in a plane slightly above the toothed face of the cutter, the blade sections are staggered as shown in Fig. 5 and overlap each other only slightly. The radial spacing of the differently inclined blades increases until at the opposite end of the cutter (see Fig. 6), the blade sections 14' and 14" are divided into radially spaced groups so that in spite of the close spacing of their active ends, each blade is separated from the others by a substantial width of body metal and thus supported with the proper rigidity. By tilting the blades 14' and 14" circumferentially at the different angles $c$ and $e$, any possibility of interference of blades is avoided and the blade sections are distributed evenly in the body metal. Thus, as shown in Fig. 5, this differential tilting results in location of the apex 40 of each blade 14' about midway between the bases 25 of two inner blades 14.

The different blade inclinations as above described are, of course, determined by the angles of the blade recesses. These may be broached at the desired angles without appreciably increasing manufacturing costs.

By tilting the blades circumferentially as above described at twenty-five and forty-five degrees to radii of the cutter, correspondingly different shear angles are imparted to the main cutting edges on the different blades. This alternate variation in the shear angles of successive blades minimizes any tendency of the cutter to chatter due to amplification in one blade of any vibration set up in the preceding blade. This vibration tendency is also minimized by the rake angles of the adjacent blades which differ due to the differences in the shear angles and also by twisting the blades as described above. Thus, in spite of the close spacing of the cutter teeth which ordinarily would be expected to increase vibration, no noticeable chatter has been observed.

I claim as my invention:

1. A face milling cutter for removing a metal layer from a work piece to form a surface thereon by relative feeding movement between the rotating cutter and work piece parallel to said surface, said cutter having a rotary body, and a multiplicity of teeth of generally triangular cross-section spaced around the periphery of said body and projecting from the end surface thereof, the sides of adjacent teeth and said end surface being shaped and positioned to define funnel shaped chip recesses each having a throat adjacent one cutting edge and side and top walls diverging inwardly and away from such edge in planes respectively parallel and perpendicular to said work surface whereby to insure inward deflection of the chips removed by the respective cutting edges.

2. A face milling cutter for removing a metal layer from a work piece to form a surface thereon by relative feeding movement between the rotating cutter and work piece parallel to said surface, said cutter having a rotary body, a multiplicity of teeth spaced around the periphery of said body and projecting from the end surface thereof, the sides of adjacent teeth and said end surface being shaped and positioned to define funnel shaped chip recesses each having a throat adjacent one cutting edge and side and top walls diverging inwardly and away from such edge in planes respectively parallel and perpendicular to said work surface whereby to insure inward deflection of the chips removed by the respective cutting edges, and said chip recesses being of such narrow widths at their outer ends as to prevent outward flow of the chips.

3. A face milling cutter having, in combination, a rotatable cylindrical body, a multiplicity of blades of generally triangular cross-section having ends projecting from one end of said body in a single annular series, with one side of the triangle facing outwardly, and cutting edges formed on said ends equidistant from the rotational axis of said body and each directing its chip into the inwardly diverging passage defined by the opposed sides of the adjacent blades, said blades being mounted in said body at varying angles whereby in a plane axially spaced from said body end, the blade sections are disposed in a plurality of annular series radially spaced apart.

4. An inserted blade milling cutter having a body and two sets of blades mounted therein at different angles relative to the plane of cutter rotation and cooperating with the cutter body to form a multiplicity of chip passages with walls flaring away from the cutting edge and with narrow throats positioned to receive and trap therein the chips formed by the respective blades.

5. An inserted blade milling cutter comprising a multiplicity of blades of generally triangular cross-section substantially throughout their lengths and locking formations spaced along one side, a rotatable body having openings complementing the cross-sectional shape of said blades and receiving the latter with said sides facing radially and outwardly, wedges having formations interfitting with formations of the respective blades and shiftable with the blades longitudinally of said openings to lock the blades in said body, and cutting edges formed on the projecting blade ends adjacent one margin of said sides, the other two sides of each blade being smooth and converging inwardly so as to coact with a side of the adjacent blade to form an inwardly diverging passage having a constricted throat for receiving and trapping in the passage the chips removed by the associated cutting edge.

6. An inserted blade cutter comprising a multiplicity of blades of generally triangular cross-section substantially throughout their lengths and locking formations spaced along one side, a rotatable body having smooth walled openings complementing the cross-sectional shape of said blades and receiving the latter with said formed sides facing radially and outwardly, longitudinal grooves formed in the outer wall of each of said openings, wedges having formations interfitting with formations of the respective blades and seated in said grooves to lock the blades in said body, and cutting edges formed on the projecting blade ends adjacent one margin of said formed sides.

7. A face milling cutter having, in combination, a rotatable cylindrical body, a multiplicity of blades of triangular cross-sections mounted on said body with their ends projecting from one end of the body and with one side of the triangle facing outwardly, cutting edges formed on said projected ends at the leading edges thereof, said blades being spaced close together so that the sides of adjacent projecting ends form chip passages diverging inwardly to direct the flow of chips inwardly toward the cutter axis, and the adjacent blades being disposed at different angles relative to the plane of cutter rotation and also turned about their longitudinal axes at different angles to set the cutting edges of successive blades for engagement with the work at different rake and shear angles whereby to eliminate chatter of the cutter in spite of the close spacing of the blades.

8. A milling cutter for removing a metal layer from a workpiece to form a surface thereon by relative feeding movement between the rotating cutter and the workpiece, said cutter comprising, in combination, a cylindrical body, an annular series of circumferentially spaced teeth of generally triangular cross-section projecting from the end of said body a distance sufficient to permit of chip flow radially inwardly through the spaces between said work surface and said body end, one side of each tooth triangle facing outwardly while the remaining leading and trailing sides converge inwardly so that the opposed sides of adjacent teeth define a chip passage which flares inwardly toward the cutter axis, and a side cutting edge formed on each tooth at the junction of the outwardly facing side and the leading edge thereof whereby to constitute the latter the cutting face, the latter face being positioned to induce the natural flow of chips radially inwardly and being spaced from the apex of the preceding tooth a distance substantially less than the width of said outwardly facing tooth side so as to define a narrow chip passage entrance for receiving the inwardly flowing chips and trapping the same in the passage whereby to insure continued inward movement of the chips and discharge thereof from the enlarged inner end of the passage.

9. A milling cutter for removing a metal layer from a workpiece to form a surface thereon by rotation of the cutter about an axis normal to the work surface combined with relative feeding movement between the rotating cutter and the workpiece along the work surface, said cutter comprising, in combination, a rotatable body, an annular series of circumferentially spaced teeth projecting from the end of said body a distance to permit of chip flow radially and inwardly between said work surface and said body end, a side on each tooth facing outwardly and having a cutting edge along the leading edge, a cutting face on the leading side of each tooth positioned to induce the chips formed by said edge to flow inwardly toward the cutter axis, and a third side on each tooth converging toward and merging with the cutting face of the tooth and cooperating with the cutting face of the succeeding tooth to define a chip passage having a narrow throat adjacent the cutting edge for receiving the chips formed thereby and side walls diverging radially inwardly from said throat and guiding the chips to continue their flow inwardly between the body and the work surface, said throat having a circumferential width which is a minor part of the circumferential width of each tooth, whereby the chips formed by each cutting edge are trapped in the passage leading inwardly therefrom.

10. A milling cutter for removing a metal layer from a workpiece to form a surface thereon by relative feeding movement between the rotating cutter and the workpiece, said cutter comprising, in combination, a cylindrical body, an annular series of circumferentially spaced teeth projecting from the end of said body a distance to permit of chip flow radially and inwardly between said work surface and said body end, a side on each tooth facing outwardly and having a cutting edge along the leading edge, a cutting face on each tooth positioned to induce the chips formed by said edge to flow inwardly toward the cutter axis, and a third side on each tooth converging inwardly toward the cutting face and cooperating with the cutting face of the succeeding tooth to define an inwardly flaring chip passage having a narrow entrance for receiving the chips formed by one of said cutting edges, and an end surface on said body defining the top of said chip passage and diverging radially inwardly away from the work surface whereby to provide for inward flaring of the passage in a second direction.

11. A milling cutter having, in combination, a rotatable body, an annular series of blades of generally equilateral triangular cross-sections mounted on said body for endwise adjustment with one side of each triangle facing radially outwardly and with the blade ends projecting from one end of said body a distance such as to permit of the inward flow of chips between the body end and said work surface, and a side cutting edge formed on each of said blades at the junction of said outwardly facing side and the adjacent second side of the triangle which defines the cutting face of the blade and which is positioned to induce the chips formed by said cutting edge to naturally flow inwardly and enter the throat of the inwardly flaring chip passage formed by the cutting face and the third side of the preceding blade, the adjacent blades being inclined at different angles relative to the plane of cutter rotation so as to permit of close spacing of said projecting ends and the formation of said chip passages with narrow throats.

12. A milling cutter for removing a metal layer from a workpiece to form a surface thereon by relative feeding movement between the rotating cutter and the workpiece, said cutter comprising, in combination, a cylindrical body having a coned end surface diverging outwardly along the axis of the body, annular series of circumferentially spaced teeth projecting from said cone end surface whereby the latter surface provides for radial inward flaring of the chip passages defined between the adjacent teeth, and cutting edges formed on said teeth for removing chips and directing the latter inwardly along said passages toward the cutter axis.

13. A milling cutter having, in combination, a cylindrical body having circumferentially spaced holes extending longitudinally of the body axis and opening at one end of the body in single annular series and at the other end in a plurality of concentric spaced annular series, and a blade mounted in each hole for endwise adjustment and having one end projecting from said first mentioned end of said body to form a cutting tooth, said blades being of generally triangular cross-section having one side facing outwardly from the cutter axis whereby the other sides of the adjacent projecting ends define chip passages diverging radially inwardly.

CHARLES E. KRAUS.